United States Patent
Schneider

(10) Patent No.: US 6,206,408 B1
(45) Date of Patent: Mar. 27, 2001

(54) AIR BAG MODULE EMERGENCY VENTING SYSTEM

(75) Inventor: David W. Schneider, Waterford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/237,015

(22) Filed: Jan. 25, 1999

(51) Int. Cl.$^7$ .................................................. B60R 21/16
(52) U.S. Cl. .................................. 280/728.1; 280/728.2; 280/728.3; 280/739; 280/740
(58) Field of Search .......................... 280/728.1, 728.2, 280/728.3, 739, 740

(56) References Cited

U.S. PATENT DOCUMENTS

| | | | |
|---|---|---|---|
| 4,964,652 | 10/1990 | Karlow . | |
| 5,388,860 | 2/1995 | Brede et al. . | |
| 5,524,925 | 6/1996 | Rose et al. . | |
| 5,564,732 | * 10/1996 | Bauer et al. | 280/728.3 |
| 5,564,738 | 10/1996 | Johnson . | |
| 5,566,975 | 10/1996 | Stull et al. . | |
| 5,573,269 | 11/1996 | Gentry et al. . | |
| 5,645,297 | 7/1997 | Rose et al. . | |
| 5,664,802 | 9/1997 | Harris et al. . | |
| 5,709,402 | * 1/1998 | Leonard | 280/728.2 |
| 5,718,447 | * 2/1998 | Rose et al. | 280/728.2 |
| 5,722,684 | * 3/1998 | Saderholm | 280/728.3 |
| 5,775,723 | * 7/1998 | Dede et al. | 280/728.2 |
| 5,779,265 | * 7/1998 | Rose et al. | 280/728.2 X |
| 5,803,484 | * 9/1998 | Orme | 280/728.2 |
| 5,813,707 | * 9/1998 | Bohn | 280/728.2 |
| 5,816,607 | * 10/1998 | Bugdaci et al. | 280/728.2 |
| 5,820,160 | * 10/1998 | Johnson et al. | 280/728.2 |
| 5,851,023 | * 12/1998 | Nagata et al. | 280/728.3 |
| 5,857,696 | * 1/1999 | Inoue et al. | 280/728.2 |
| 5,887,891 | * 3/1999 | Taquchi et al. | 280/728.2 |
| 5,931,489 | * 8/1998 | Damman et al. | 280/728.2 |
| 5,934,700 | * 8/1999 | Disam et al. | 280/728.2 |
| 6,017,055 | * 1/2000 | Cuevas | 280/728.2 |
| 6,039,341 | * 3/2000 | Doxey et al. | 280/728.2 |

* cited by examiner

*Primary Examiner*—Lanna Mai
*Assistant Examiner*—Toan C To
(74) *Attorney, Agent, or Firm*—Sally J. Brown

(57) ABSTRACT

An air bag safety system with an emergency venting assembly. The air bag system includes an air bag cushion, an inflator assembly and a cover that is movably attached to the inflator assembly. The inflator assembly includes an inflator and a housing with a side wall assembly configured to cooperate with the cover. The side wall assembly comprises an inner wall having a hole formed therein and an outer wall. The cover is movably attached to the inflator assembly. The cover has a side wall with an emergency relief vent formed therein. The cover further has a first position and a second position such that when the cover is in the first position the emergency relief vent on the side wall of the cover is substantially aligned with the hole in the inner wall of the housing so as to allow the inflation fluid to exit the inflator assembly. When the cover moves to the second position the cover has been laterally displaced in relation to the inflator assembly such that the emergency relief vents in the side wall of the cover and the hole in the inner wall of the housing are no longer aligned thereby forcing the inflation fluid into the air bag. The displacement of said cover from the first position to the second position reduces the force with which the air bag cushion breaks through the cover. The emergency venting assembly also includes an attachment assembly that is configured to attach the cover to the inflator assembly such that the cover can slidably move from the first position to the second position. The attachment assembly comprises a cover retention feature that is connected to inner wall of the side wall assembly of the housing and extends outwardly therefrom and a slide channel formed in the side wall of the cover. The slide channel is sized and configured to cooperate with the cover retention feature so as to allow the cover to move between the first position and the second position.

31 Claims, 2 Drawing Sheets

AIR BAG MODULE EMERGENCY VENTING SYSTEM

BACKGROUND OF THE INVENTION

1. The Field of the Invention

The present invention relates to a safety device used particularly in motor vehicles which, upon the onset of a collision, deploys an inflatable restraint cushion, known as an air bag cushion, to protect the occupants of the vehicle from the impact of the collision. More particularly, this invention relates to an emergency venting system designed to reduce the "punch out" force exerted as the air bag cushion initially breaks out of the cover of the air bag system as it enters the vehicle occupant compartment of a vehicle, thereby reducing the initial impact of the air bag upon an "out-of-position" occupant.

2. The Relevant Technology

An inflatable vehicle occupant restraint, such as an air bag safety system with an inflatable air bag cushion, is inflated to protect an occupant of a vehicle upon the occurrence of a collision. When the vehicle, usually an automobile, is involved in a collision, a crash signal actuates an inflator assembly of the air bag safety system to cause the air bag cushion to deploy. Typically, an actuator triggers the inflator assembly to emit an inflation fluid or gas which flows into an air bag cushion. The inflation fluid rapidly inflates the air bag cushion from an uninflated condition to an inflated condition where the air bag cushion breaks through the outer cover and expands into the vehicle occupant compartment. When the air bag cushion is in the inflated condition, it restrains an occupant of the vehicle from forcefully striking components in the event of a sudden deceleration such as that which typically occurs in a vehicle collision.

The air bag safety system is usually mounted proximate to the seats in the vehicle in which the occupants sit. It is well known to mount the air bag safety system in the steering wheel and/or the instrument panel. Other mounting sites have been used for the air bag safety system. For example, the air bag safety system may be mounted in the door panels or on the side of the seats to protect the vehicle occupant from side impacts.

Under normal circumstances, substantially all of the inflation fluid from the inflator assembly is directed into the air bag cushion to inflate the air bag cushion. One problem associated with rapidly inflating the air bag cushion is that when the air bag cushion is initially breaking out or "punching out" of the cover of the air bag assembly, the initial forces are very high and may potentially injure someone who is too close or "out-of-position" relative to the air bag safety system at the moment of deployment. It is intended that the term "out-of-position" be broadly construed. A vehicle occupant may be "out-of-position" for a variety of reasons. Generally, "out-of-position" means that the vehicle occupant is closer than the predetermined parameters intended.

Because of the potential for injury to an "out-of-position" occupant as well as the high force with which the air bag cushion is initially deployed, there are some circumstances that it may be desirable to control or limit the amount of force with which the air bag cushion "breaks out" or "punches out" of the air bag safety system module. Various techniques have been used to attempt to control the rate of inflation of the air bag cushion. One way of reducing the initial forces exerted as the air bag cushion "punches out" of the storage position is to incorporate remote sensors to detect when a vehicle occupant is too close to the air bag safety system. When the sensors detect that a vehicle occupant is "out-of-position" at the time of deployment of the air bag cushion, the sensor sends a signal to the inflator assembly to reduce and control the rate at which an inflator assembly provides the inflation fluid to the air bag cushion. One problem with this approach is that it significantly increases the complexity of the air bag safety system and, consequently, adds to the expense of the system itself. Further, the complexity of this system makes it more difficult to manufacture, assemble, and maintain the air bag safety system.

Another method of attempting to address the potential injury to an "out-of-position" passenger in a vehicle by initial deployment of an air bag cushion, incorporates a tether inside the air bag cushion. The tether is attached to a valve assembly that has been sewn into the side of the air bag cushion. One type of valve assembly is sewn into the side of an air bag cushion. The valve assembly includes an inner panel which is pleated and folded into a stack over itself when the air bag cushion is uninflated. The inner panel is kept in place by stitching that attaches it to the air bag cushion. One end of the tether is attached to the pleats of the inner panel while the other is attached to the housing or inflator assembly. When the air bag system is actuated, inflation fluid is delivered to the air bag cushion and the air bag cushion begins to inflate. In the event that the air bag cushion encounters an "out-of-position" occupant, the tether is not fully extended and the vents remain open to allow a portion of the inflation fluid to escape the air bag cushion.

If the occupants of the vehicle are in the correct position when the air bag safety system is triggered, as the air bag cushion fully inflates the tether pulls on the inner panel of the valve assembly and severs the stitching holding the inner panel in place. The tether pulling on the inner panel of the valve assembly causes the inner panel to unfold and partially cover the vents. When the air bag is fully deployed the tether continues to pull on the inner panel until the inner panel is completely unfolded and closes off the vent openings. Covering the vents forces the inflation fluid to fill the air bag cushion. In addition to controlling the unfolding of the inner panel, the tether somewhat reduces the expansion velocity of the air bag cushion.

Another method of reducing the force of the air bag cushion as it breaks through the storage cover is to provide the air bag cushion with different types of materials or coatings to allow the inflation fluid to escape should an "out-of-position" occupant be encountered upon deployment of the air bag cushion. Various arrangements have been tried with the fabric of the air bag cushion including using coated, partially-coated, and/or uncoated fabrics with various levels of porosity which permit some of the inflation gas to be exhausted. Another method of addressing the potential for an "out of-position" occupant is to provide one or more vent openings in the wall of the air bag cushion itself to vent the inflation fluid from the interior of the air bag cushion.

The problem with the approaches that add vents, coatings, or valve assemblies to the air bag cushion is that it adds weight to the air bag cushion itself. The added features may also increase the size or thickness of the air bag cushion. This is problematic because manufacturers are consistently trying to reduce the size and/or weight of the air bag safety system. In addition, the additions or changes to the air bag cushion typically require additional parts and steps in the manufacturing process. This results in an increase in the difficulty of manufacturing the air bag cushion. Further, the added weight of the air bag cushion is detrimental to the length of time that it takes for the air bag to be deployed in normal conditions. This may reduce the effectiveness of the air bag safety system.

SUMMARY AND OBJECTS OF THE INVENTION

It is an object of the present invention to provide an air bag safety system that is configured to reduce the potential for injury to an "out-of-position" vehicle occupant.

Another object of the present invention is to provide an air bag safety system that upon encountering an "out-of-position" occupant is capable of directing the flow of inflation fluid out of the air bag safety system instead of into the air bag cushion.

A further object of the present invention is to provide an air bag safety system which is configured to reduce the initial "punch out" forces of the air bag cushion as it enters the vehicle occupant compartment.

Yet another object of the present invention to provide an air bag safety system that is configured to respond to an "out-of-position" occupant, but does not sacrifice the performance of the air bag safety system.

These and other objects and features of the present invention will become more fully apparent from the following description and appended claims, or may be learned by the practice of the invention as set forth hereinafter.

To achieve the foregoing objects, and in accordance with the invention as embodied and broadly described herein, an air bag safety system is provided that includes an air bag cushion, an inflator assembly and a cover. The inflator assembly is attached to the air bag cushion and is configured to rapidly provide an inflation fluid to the air bag cushion. The inflator assembly extends toward the cover and has a hole formed therethrough. The inflator assembly comprises a housing and an inflator disposed therein. In one embodiment, the housing has a hole formed therein.

The cover is movably attached to the inflator assembly. The cover has a first position and a second position in which the cover has been displaced in relation to the inflator assembly, thereby reducing the force with which the air bag cushion breaks through the cover. In one embodiment, the inflator assembly and the cover are movably attached such that the cover slides between the first position and the second position. The cover has an emergency relief vent formed therethrough. The emergency relief vent and the hole in the inflator assembly are substantially aligned when the cover is in the first position so as to allow the inflation fluid to escape the air bag safety system upon an "out-of-position" occupant being encountered, thereby reducing the force with which the air bag cushion breaks though the cover. The emergency relief vent and the hole in the inflator assembly are configured such that as the cover moves from the first position to the second position, the emergency relief vent in the cover and the hole in the housing are no longer aligned thereby forcing the inflation fluid into the air bag cushion.

An emergency venting assembly for an air bag safety system is also disclosed that comprises an inflator assembly and a cover. The inflator assembly includes an inflator and a housing with a side wall assembly configured to cooperate with the cover. The side wall assembly of the housing extends toward the cover and comprises an inner wall having a hole formed therein and an outer wall. The cover is movably attached to the inflator assembly. The cover has a side wall extending toward the housing of the inflator assembly with an emergency relief vent formed therein. The outer wall and said inner wall of the side wall assembly of the housing define a channel to receive the remote end of the side wall of the cover therein. The cover further has a first position and a second position such that when the cover is in the first position the emergency relief vent on the side wall of the cover is substantially aligned with the hole in the inner wall of the housing so as to allow the inflation fluid to exit the inflator assembly. When the cover moves to the second position the cover has been laterally displaced in relation to the inflator assembly such that the emergency relief vents in the side wall of the cover and the hole in the inner wall of the housing are no longer aligned thereby forcing the inflation fluid into the air bag. The displacement of said cover from the first position to the second position reduces the force with which the air bag cushion breaks through the cover.

The emergency venting assembly also includes an attachment assembly that is configured to attach the cover to the inflator assembly such that the cover can slidably move from the first position to the second position. The attachment assembly comprises a cover retention feature that is connected to inner wall of the side wall assembly of the housing and extends outwardly therefrom and a slide channel formed in the side wall of the cover. The slide channel is sized and configured to cooperate with the cover retention feature so as to allow the cover to slidingly move between the first position and the second position. The slide channel has a tear bar formed therein that extends across said slide channel to prevent inadvertent movement of the cover.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Generally, the present invention relates to an air bag safety system which is actuated when the vehicle experiences a sudden deceleration, such as a collision. In particular, the air bag safety system is configured to reduce the potential for injury caused by the very rapid inflation of an air bag cushion inflation. This type of injury is often referred to in the art as an inflation induced injury. The novel configuration of the present air bag safety system reduces or even eliminates any air bag cushion inflation induced injury that may be experienced by an "out-of-position" occupant. The term "out-of-position" is meant to encompass those vehicle occupants who for whatever reason are closer to the air bag safety system than allowed by the predetermined parameters for the air bag safety system. There can be a variety of reasons that a vehicle occupant is "out-of-position" with respect to the air bag safety system. For example, a vehicle occupant could be a child sitting on the edge of the seat or even a driver who is short and must sit unusually close to the steering wheel. Another example of an "out-of-position" occupant may occur because the passenger is bent over retrieving something off the floor when the air bag safety system is triggered. It can be appreciated by those skilled in the art that are numerous other reasons that a vehicle occupant may be "out-of-position" at the time the air bag safety system deploys.

Figure 1:
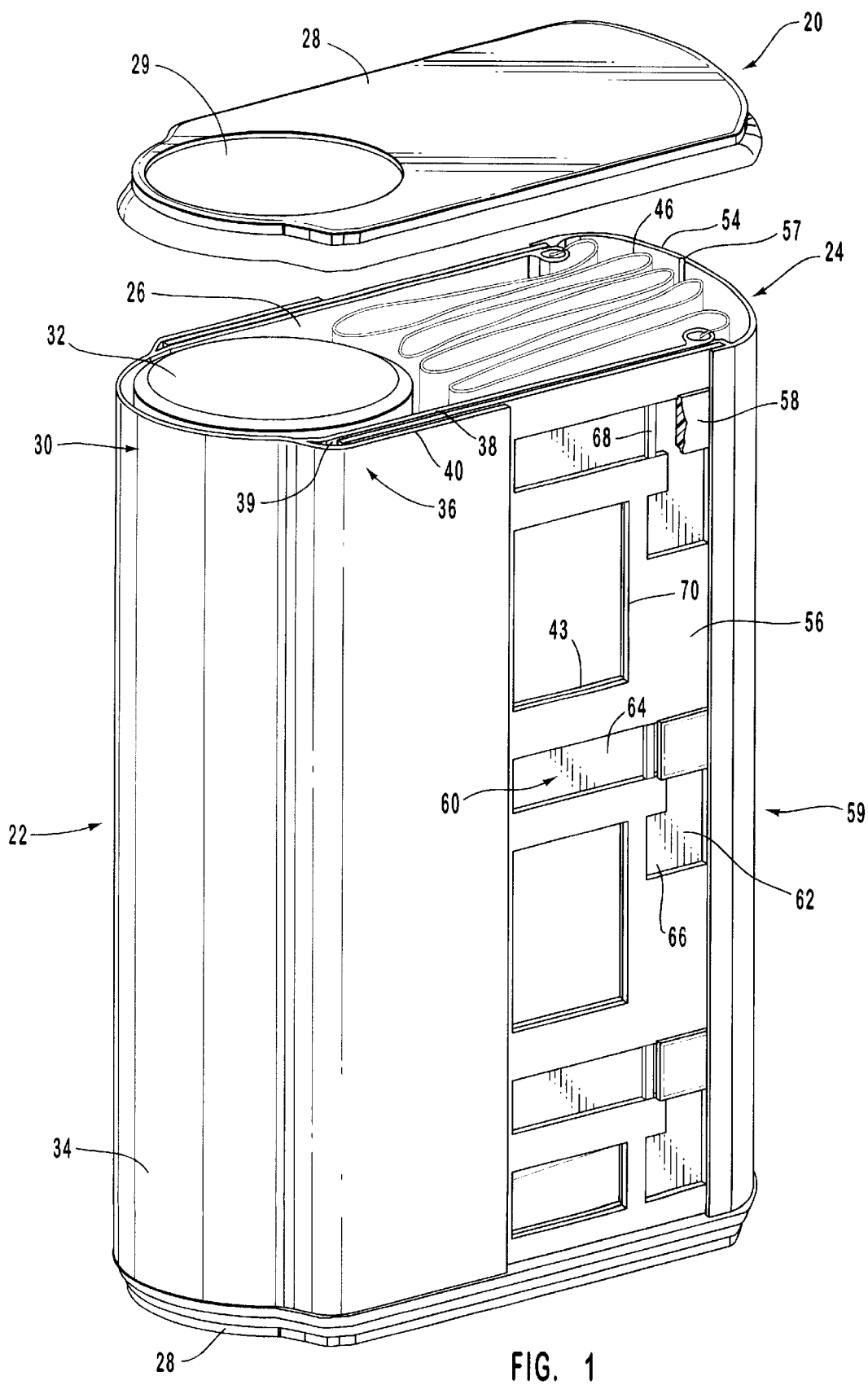
FIG. 1 is a partial breakaway exploded perspective view of one embodiment of the present invention.

One embodiment of an air bag safety system is shown generally in FIG. 1 at 20. In this embodiment, air bag safety system 20 has a somewhat elongated and rounded configuration. It can be appreciated that various other configurations of air bag safety system 20 may be utilized. For example, air bag safety system 20 may have more of a disk-like configuration. Similarly, air bag safety system 20 could be square, rectangular, oval or a variety of other shapes. The configuration of air bag safety system 20 is somewhat dependent on the space that is available for installation into the vehicle. This may be influenced by the type of vehicle and the placement of air bag safety system 20 within the vehicle. Air bag safety system 20 may have a different configuration for those that are installed in the steering wheel as opposed to those that are installed in the instrument console on the passenger side of the vehicle. Further, those air bag safety systems 20 that are used for side impacts may have various other configurations. It is intended that the present invention is applicable to these and any other placements and uses of air bag safety system 20.

In one embodiment depicted in FIG. 1, air bag safety system 20 comprises an inflator assembly 22 and a cover 24 that together define an interior chamber 26. Air bag safety system 20 also includes end caps 28 that cover each end of interior chamber 26. Inflator assembly 22 comprises a housing 30 and an inflator 32. In the figures, housing 30 is shown as having a rounded configuration. The shape of housing 30 in inflator assembly 22 is, however, not particularly important as long as housing 30 is shaped and configured to cooperate with inflator 32 and cover 24. In addition, housing 30 must, as previously mentioned, be configured to fit into the particular location in the vehicle that air bag safety system 20 is to be attached.

As illustrated, inflator 32 is disposed in housing 30. In one embodiment, at least one of end caps 28 has an optional opening 29 formed therein. Opening 29 allows inflator 32 to be slid into housing 30 even after air bag safety system 20 has been assembled. This is advantageous because inflator 32 is one of the most sensitive as well as expensive parts of air bag safety system 20. Therefore, depending on the specific type of inflator 32 that is used in inflator assembly 22, there may be times that it is preferred to reduce or minimize the amount of handling and jarring that will be experienced by inflator 32. In those cases, the present design of end cap 28 allows inflator 32 to be inserted into air bag safety system 20 just prior to shipping or attachment of air bag safety system 20 to the vehicle.

One embodiment of housing 30 shown in FIG. 1 has a back wall 34 and a side wall assembly 36. Side wall assembly 36 actually comprises an inner wall 38 and an outer wall 40. In this embodiment of housing 30, inner wall 38 and outer wall 40 are set apart from each other and are substantially parallel. Inner wall 38 and outer wall 40 define a channel 39 therebetween that is depicted most clearly in FIG. 3. Inner wall 38 has holes 43 formed therein that will be discussed in further detail below. It will be appreciated that side wall assembly 36 may have various other configurations. For example, side wall assembly 36 may only comprise inner wall 38. The removal of outer wall 40 of side wall assembly 36 would not substantially effect the function of air bag safety system 20.

Figure 2:
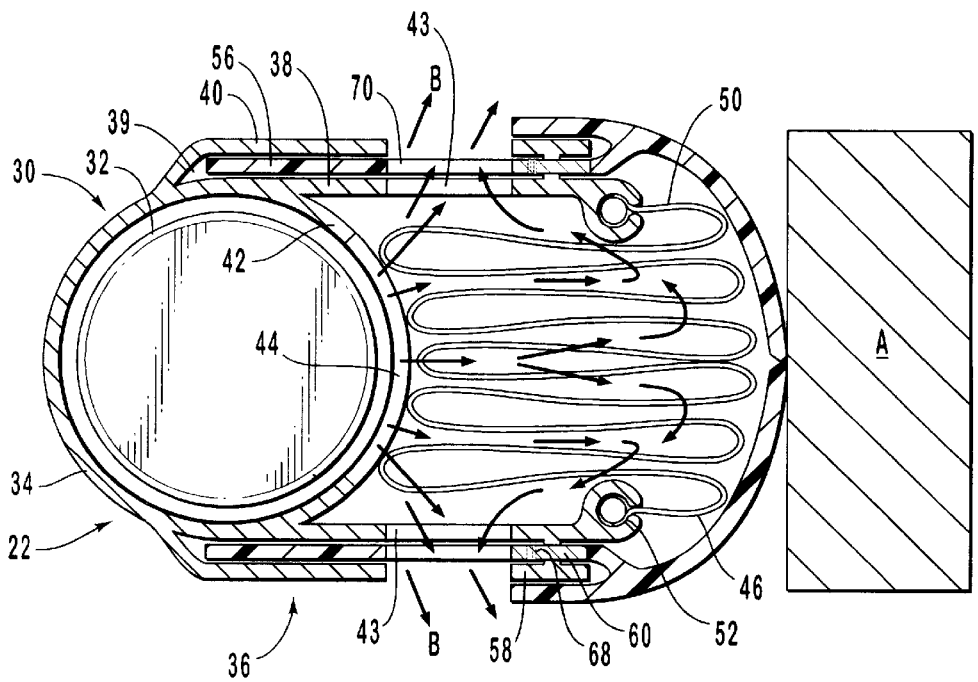
FIG. 2 is a cross-sectional view of the structure of FIG. 1 upon encountering an "out-of-position" object or occupant.
Figure 3:
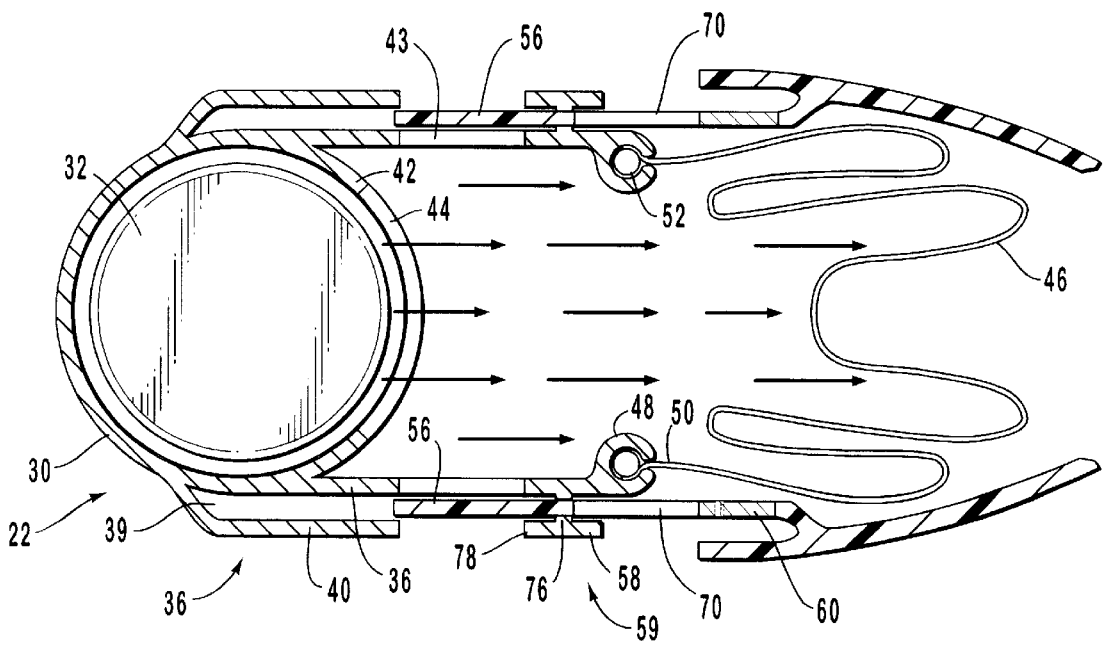
FIG. 3 is a cross-sectional view of the structure of FIG. 1 in normal operation.

Housing 30 also has a front wall 42 illustrated in FIGS. 2 and 3 which faces toward the passenger compartment of the vehicle. Front wall 42 holds inflator 32 in the correct position and orientation relative to air bag cushion 46. In one embodiment of housing 26, front wall 42 has an aperture 44 formed therein. It can be appreciated that front wall 42 of housing 30 may have various numbers of apertures 44 formed therethrough. Further, aperture 44 may have various configurations.

As depicted in the figures, in one embodiment of housing 30 has a connecting member 48 formed on the remote end of inner wall 36. Connecting member 48 is attached to inlet end 50 of air bag cushion 46. More particularly, inlet end 50 of air bag cushion 46 has a connector 52 attached thereto such that inlet end 50 of air bag cushion 48 is held in place while air bag cushion 48 is rapidly inflated by the inflation fluid released by inflator assembly 22 upon actuation. Connecting member 48 and connector 52 may have various other configurations and perform the function thereof. By way of example and not limitation, connector 52 attached to inlet end 50 of air bag cushion 46 could be shaped as a hook and connecting member 48 could correspondingly be shaped as a loop. Alternatively, connector 52 could be a male member that is received in a corresponding female shaped connecting member 48. Additionally, the positions of connecting member 48 and connector 52 could be reversed without effecting the function thereof.

As previously mentioned, inflator assembly 22 includes inflator 32. FIGS. 1–3 depict one embodiment of an inflator 32 used to provide inflation fluid to fill air bag cushion 46. Inflator 32 remains inactive until a collision occurs, and then rapidly produces or releases an inflation fluid to inflate air bag cushion 46. Inflator 32 may be any type of inflator that is used to rapidly generate or release an inflation fluid to inflate air bag cushion 46. By way of example and not limitation, types of inflators which may be incorporated as part of the present invention are hybrid, stored gas, pyrotechnic and/or other types of inflators. Inflator 32 is one embodiment of structure capable of performing the function of an inflator means for rapidly providing air bag cushion 46 with inflation fluid. While the present invention is depicted as having a cylindrical-shaped inflator 32, it can be appreciated that various other configurations and conventional types of inflators 32 can be utilized in the present invention. For example and without limitation, inflator 32 could be oval, square, circular, rectangular, or combinations thereof. Inflator 32 must be configured to cooperate with housing 30 of inflator assembly 22.

Regardless of the specific type of inflator 32 that is utilized, inflator 32 has diffuser holes (not shown) through which the inflation fluid exits inflator 32 upon actuation. In one embodiment depicted in FIGS. 2–3 diffuser holes (not shown) are aligned with opening 44 formed in front wall 42 of housing 22. The diffuser holes may be formed in various other locations of inflator 32. For example, the diffuser holes could be formed in the back of inflator 32 as long as the inflation fluid has a way to travel around inflator 32 toward inlet end 50 of air bag cushion 46. Various numbers and configurations of diffuser holes may be utilized.

As previously mentioned, air bag safety system 20 also includes cover 24. Cover 24 and inflator assembly 22 enclose air bag cushion 46 therein as illustrated in FIGS. 1 and 2. Cover 24 is configured to cooperate with inflator assembly 22. Referring to FIG. 1, cover 24 has a front wall 54 which faces the passenger occupant compartment of the vehicle and side walls 56 that extend away from front wall 54 of cover 24 toward inflator assembly 22. As is depicted in FIGS. 1 and 2, front wall 54 of cover 24 has a scored or perforated section 57 formed therein which will rupture as shown in FIG. 3 upon a predetermined amount of inflation fluid being directed into air bag cushion 46 and exerting sufficient forces upon front wall 54 of cover 24 to tear perforated section or scoring 57.

In one embodiment, cover 24 is attached to housing 30 of inflator assembly 22 in a sliding engagement. More specifically, cover 24 is configured to cooperate with side wall assembly 36 of housing 22. In particular, cover 24 has a first position depicted in FIGS. 1 and 2 and an second position illustrated in FIG. 3. As illustrated in FIGS. 1–3, cover 24 is attached to housing 30 of inflation assembly 22 by an attachment assembly 59 that includes cover retention features 58 and slide channels 60. Cover retention features 58 extend outwardly from inner wall 38 of side wall assembly 36 of housing 30. In one embodiment, cover retention features 58 are "T-shaped" as illustrated in FIGS. 2 and 3. Cover retention features 58 comprise stem 76 and locking head 78. It can be appreciated that cover retention features 58 may have various other configurations without effecting the function thereof.

Referring to FIG. 1, side wall 56 of cover 24 has slide channels 60 formed therein which are configured to cooperate with cover retention features 58 formed on housing 30. In one embodiment of cover 24, slide channels 60 are "L-shaped." It will be appreciated that slide channels 60 may have various other configurations without affecting the function thereof. Slide channels 60 have a first portion 62 and a second portion 64. First portion 62 of slide channel 60 is configured to allow cover 24 to be attached over locking head 78 of cover retention feature 58 and then slid into place. As illustrated, the remote end 66 of first portion 62 of slide channel 60 has been oversized to allow locking head 78 of cover retention feature 58 to fit therethrough. Second portion 64 of slide channel 60 is in communication with first portion 62 and is configured to allow cover 24 to move between the first position depicted in FIGS. 1 and 2 and second position illustrated in FIG. 3. Once cover retention feature 58 has been inserted through oversized remote end 66 of first portion 62, cover 24 is slid into place so that cover retention features 58 move into second portion 64 of slide channels 60. As a result, cover 24 is locked onto housing 30 of inflator assembly 22. As illustrated in FIG. 1, in this embodiment once cover 24 is attached to inflator assembly 22, cover retention features 58 are in the intersection of first portion 62 and second portion 64 of slide channel 60. Slide channel 60 has a relatively thin tear bar 68 formed therein to retain cover 24 in the first position until air bag safety system 20 is activated.

Other configurations of slide channels 60 and cover retention features 58 may be utilized. For example, instead of being "L-shaped" and having a first portion 62 with an oversized remote end 66 and a second portion 64, slide channel 60 could be a continuous slot. In other words, first portion 62 would be eliminated. Further, oversized remote end 66 could be eliminated. With this configuration of slide channel 60, retention feature 58 would be a resilient material with a locking head 78 that could be snap fit into the slide channel 62. Retention feature 58 may still be "T-shaped" or may have various other configurations of locking head 78, such as round, oval, triangular or other shapes. The specific configuration of retention features 58 is not critical as long as it is configured to cooperate with slide channel 60 to attach cover 24 to inflator assembly 22.

In addition, although FIG. 1 depicts three (3) cover retention features 58 and corresponding slide channels 60, various other numbers and arrangements of retention features 58 and slide channels 60 would perform the function thereof. Additionally, although FIGS. 2 and 3 show retention features 58 and slide channels 60 on both side wall 56 of cover 24, it will be appreciated that retention features 58 and slide channels 60 may only be on one side wall 56.

Slide channel 60 and cover retention feature 58 are one embodiment of structure capable of performing the function of an attaching means for attaching cover 24 to inflator assembly 22 so as to allow cover 24 to be displaced in relation to inflator assembly 22 between a first position and a second position. Various other configurations of attaching means are effective in carrying out the function thereof.

Side wall 56 of cover 24 also has emergency relief vents 70 or valves formed therein. Emergency relief vents 70 are positioned and configured to be substantially aligned with holes 43 formed in side wall assembly 36 of housing 30. In particular, emergency relief vents 70 are substantially aligned with holes 43 formed in inner wall 38 of housing 30. Emergency relief vents 70 and holes 43 in inner wall 38 of housing 30 are illustrated in FIG. 1 as being substantially rectangular. It can be appreciated that emergency relief vents 70 and holes 43 may have various other configurations as long as the configuration of emergency relief vents 70 is substantially the same as holes 43. By way of example and not limitation, emergency relief vents 70 and holes 43 may be round, oval, elliptical, square, triangular or any combination thereof. The particular shape of emergency relief vents 70 and holes 43 is not particularly important. What is important is that emergency relief vents 70 and holes 43 in housing 30 are substantially aligned when cover 24 is in the first position and allows the inflation fluid to escape the interior chamber 26 formed by inflator assembly 22 and cover 24 should cover 42 encounter an "out-of-position" occupant A as depicted in FIG. 2. In addition, although FIG. 1 depicts three (3) emergency relief vents 70 and holes 43 it will be appreciated that various other numbers of emergency relief vents 70 and holes 43 may be used.

As shown in FIG. 1, cover 24 has a first position in which cover retention features 58 are against or proximate to tear bar 68. When cover 24 is in the first position, emergency relief vents 70 are aligned with holes 43 formed in inner wall 38 of housing 30. As long as cover 24 is in this position, in the event that inflator assembly 22 is actuated, the majority of the inflation fluid exits air bag safety system 20 through emergency relief vents 70 and holes 43 formed in housing 30 as indicated by the arrows B in FIG. 2.

It will be appreciated by one skilled in the art that the position of slide channels 60 and retention features 58 could be interchanged. Specifically, retention features 58 could be formed on cover 24 and, correspondingly, slide channels 60 would be formed in housing 30. What is important is that cover 24 can move on cover retention features 58 toward the passenger compartment of the vehicle. In an alternate embodiment, retention features 58 would be formed on the inside surface of side wall 56 of cover 24 and extend inwardly. In this case, slide channels 60 would be formed in inner wall 38 of side wall assembly 36 of housing 30. Slide channels 60 could be configured as depicted in FIG. 1 but formed in inner wall 38 or alternatively be only a continuous slot as previously discussed. Likewise, slide channels 60 could be formed in outer wall 40 of side wall assembly 38. In that case, retention features 58 would be formed in side wall 56 of cover 24 and extend outwardly therefrom. Outer wall 40 and inner wall 38 would have emergency relief vents 70 formed therein that are aligned with holes 40 when cover 24 is in the first position. It will be appreciated that various other configurations of slide channels 60 and retention features 58 perform the function thereof.

In use, upon the onset of a collision or sudden deceleration, inflator assembly 22 is actuated causing inflation fluid to be rapidly produced or released from inflator 32 through diffuser holes (not shown) and opening 44 in front wall 42 of housing 30 to inflate air bag cushion 46. As the inflation fluid exits inflator assembly 26 and moves toward inlet end 50 of air bag cushion 46, the inflation fluid and air bag cushion 46 exert force on the inside surface of front wall 54 of cover 24. In the event that "out-of-position" occupant A is encountered as illustrated in FIG. 2, cover 24 does not continue to slide toward the passenger compartment. As a result, cover 24 stays in the first position where emergency relief vents 70 and holes 43 are aligned. This allows the inflation fluid to escape through holes 43 in inner wall 38 of housing 32 and emergency relief vents 70 formed in side walls 56 of cover 24. As a result, any force exerted on "out-of-position" occupant A by the activation of air bag safety system 20 has been minimized and in some cases even substantially eliminated.

In the usual case where there is not an "out-of-position" occupant A upon actuation of inflator assembly 22, the forces exerted on the inside surface of front wall 54 of cover 24 by inflation fluid filling air bag cushion 46 build up until they are strong enough to cause cover retention feature 58 to break through tear bar 68. Once tear bar 68 is broken the forces continue to urge cover 24 to slide on retention features 58 in slide channels 60 so that cover 24 moves toward the passenger compartment of the vehicle. The forces created by the rapid production or release of inflation fluid from inflator 32 slidingly moves cover 24 on cover retention features 70 in slide channel 60 toward the passenger compartment of the vehicle until cover retention feature 58 reaches the rear most part of second portion 64 of slide channels 60. As a result of the sliding movement of cover 24 toward the passenger compartment, emergency relief vent 70 formed in side wall 56 of cover 24 has moved relative to side wall assembly 36 of housing 30. Consequently, hole 43 in inner wall 38 and emergency relief vent 70 become unaligned causing emergency relief vent 70 and hole 43 to be blocked and closed off. This causes all of the inflation fluid to rush into air bag cushion 46. At a predetermined pressure, the inflation fluid in the air bag cushion 46 exerts sufficient force to tear or rupture perforated section or scoring 57 in front wall 54 of cover 24 as illustrated in FIG. 3. Once front wall 54 of cover 24 has ruptured air bag cushion 46 is released into the passenger compartment.

It will be appreciated by those skilled in the art that even if no "out-of-position" occupant is encountered, this novel configuration has the benefit of reducing the "burst through" or "punch out" forces of air bag cushion 46 as it ruptures cover 24 because of the sliding movement of cover 24.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An air bag system that comprises:
   (a) an air bag cushion;
   (b) an inflator assembly for rapidly providing said air bag cushion with an inflation fluid, said inflator assembly having a hole formed therethrough; and
   (c) a cover movably attached to said inflator assembly said cover having a first position and a second position in which said cover is displaced in relation to said inflator by the force of said inflation fluid prior to rupturing of said cover, thereby reducing the force with which said air bag cushion breaks through said cover, said cover fixer comprising an emergency relief vent formed therethrough, said emergency relief vent in said cover and said hole in said inflator assembly being substantially aligned when said cover is in said first position so as to allow said inflation fluid to escape said inflator assembly upon an out-of-position occupant being encountered.

2. An air bag safety system as recited in claim 1, wherein said inflator assembly is configured to cooperate with said cover.

3. All air bag safety system as recited in claim 2, wherein said inflator assembly and said cover are movably connected such that said cover moves between said first position and said second position.

4. An air bag safety system as recited in claim 1, wherein said emergency relief vent and said hole in said inflator assembly are configured such that as said cover moves from said first position to said second position, said emergency relief vent and said cover are no longer aligned thereby forcing said inflation fluid into said air bag cushion.

5. An air bag system that comprises:
   (a) an air bag cushion;
   (b) an inflator assembly attached to said air bag cushion, said inflator assembly being configured to rapidly provide said air bag cushion an inflation fluid;
   (c) a cover movably attached to said inflator assembly, said cover having a first position and a second position in which said cover is displaced in relation to said inflator assembly by the force of said inflation fluid, said inflator assembly extending toward said cover and having a hole formed therethrough said covering having an emergency relief vent formed therethrough, said emergency relief vent and said hole in said inflator being aligned when said cover is in said first position so as to allow said inflation fluid to escape said inflator assembly upon an out-of-position occupant being encountered, thereby reducing the force with which said air bag cushion breaks through said cover.

6. An air bag safety system as recited in claim 5, wherein said inflator assembly and said cover are sliding attached such that said cover slides between said first position and said second position.

7. An air bag safety system as recited in claim 5, further comprising attachment means for attaching said cover to said inflator assembly such that said cover is displaced between said first position and said second position.

8. An air bag safety system as recited in claim 7, wherein said attachment means comprises:
   (a) a cover retention feature; and
   (b) a slide channel sized and configured to cooperate with said cover retention feature so as to allow said cover to move between said first position and said second position upon actuation of said inflator assembly.

9. An air bag safety system as recited in claim 5, wherein said inflator assembly comprises a housing and an inflator disposed therein.

10. An air bag safety system as recited in claim 9, wherein said housing includes a side wall assembly configured to cooperate with said cover.

11. An air bag safety system as recited in claim 5, wherein said emergency relief vent and said hole in said inflator assembly are configured such that as said cover moves from said first position to said second position, said emergency relief vent in said cover and said hole in said side wall assembly are no longer aligned thereby forcing said inflation fluid into said air bag cushion.

12. An air bag safety system that comprises:
   (a) an air bag cushion;
   (b) an inflator assembly attached to said air bag cushion, said inflator assembly comprising a housing and an inflator configured to rapidly provide said air bag cushion with an inflation fluid, said housing having a hole formed therein; and
   (c) a cover slidably attached to said housing, said cover having an emergency relief vent formed therein, said cover having a first position and a second position such that when said cover is in said first position said emergency relief vent is aligned with said hole in said housing so as to allow said inflation fluid to exit said inflator assembly and when said cover is in said second position said cover has been laterally displaced in relation to said inflator assembly such that said emergency relief vent and said hole in said housing are no longer aligned, thereby reducing the force with which said air bag cushion breaks through said cover.

13. An air bag safety system as recited in claim 12, further comprising an attachment assembly configured to attach said cover to said inflator assembly such that said cover can slidably move from said first position to said second position.

14. An air bag safety system as recited in claim 13, wherein said attachment means comprises:
   (a) a cover retention feature connected to said housing and extending outwardly therefrom; and
   (b) a slide channel formed in said cover, said slide channel being sized and configured to cooperate with said cover retention feature so as to allow said cover to move between said first position and said second position.

15. An air bag safety system as recited in claim 14, wherein said housing includes a side wall assembly configured to cooperate with said cover, said side wall assembly extending toward said cover and having said hole formed therein.

16. An air bag safety system as recited in claim 14, wherein said slide channel has a tear bar formed therein, said tear bar extending laterally across said slide channel.

17. An air bag safety system as recited in claim 12, wherein as said cover moves from said first position to said second position said emergency relief vent in said cover and said hole in said side wall assembly are no longer aligned, thereby forcing said inflation fluid into said air bag cushion.

18. An emergency venting assembly for an air bag safety system, said emergency venting system comprising:
   (a) an inflator assembly having a hole formed therethrough; and
   (b) a cover movably attached to said inflator assembly, said cover having a emergency relief vent formed therein, said cover further having a first position and a second position such that when said cover is in said first position said emergency relief vent is substantially aligned with said hole in said inflator assembly so as to allow said inflation fluid to exit the air bag safety system and when said cover moves to said second position said cover has been laterally displaced in relation to said inflator assembly and said emergency relief vents and said hole in said inflator assembly are no longer aligned forcing the inflation fluid into the air bag, said cover being configured such that said displacement of said cover from said first position to said second position reduces the force with which said air bag cushion breaks through said cover.

19. An emergency venting assembly as recited in claim 18, wherein said inflator assembly and said cover are sliding attached such that said cover slides between said first position and said second position.

20. An emergency venting assembly as recited in claim 18, further comprising attachment means for attaching said cover to said inflator assembly such that said cover is displaced in relation to said inflator assembly.

21. An emergency venting assembly as recited in claim 20, wherein said attachment means comprises:
   (a) a cover retention feature; and
   (b) a slide channel sized and configured to cooperate with said cover retention feature so as to allow said cover to slidingly move between said first position and said second position upon actuation of said inflator assembly.

22. An emergency venting assembly as recited in claim 21, wherein said inflator assembly comprises a housing and an inflator disposed therein.

23. An emergency venting assembly as recited in claim 23, wherein said housing includes a side wall assembly configured to cooperate with said cover.

24. An emergency venting assembly as recited in claim 18, wherein said side wall assembly comprises:
   (a) an inner wall having said hole formed therethrough; and
   (b) an outer wall, said inner wall and said outer wall defining channel therebetween configured to receive the remote end of said cover therein.

25. An emergency venting assembly for an air bag safety system, said emergency venting system comprising:
   (a) an inflator assembly comprising a housing and an inflator, said housing having a hole formed therethrough; and
   (b) a cover movably attached to said inflator assembly, said cover having a side wall extending toward said housing, said side wall having an emergency relief vent formed therein, said cover further having a first position and a second position such that when said cover is in said first position said emergency relief vent is substantially aligned with said hole in said housing so as to allow said inflation fluid to exit said inflator assembly and when said cover moves to said second position said cover has been laterally displaced in relation to said inflator assembly such that said emergency relief vents in said cover and said hole in said housing are no longer aligned so as to force said inflation fluid into the air bag, said cover being configured such that said displacement of said cover from said first position to said second position reduces the force with which said air bag cushion breaks through said cover.

26. An emergency venting assembly as recited in claim 25, further comprising an attachment assembly configured to attach said cover to said inflator assembly such that said cover can slidably move from said first position to said second position.

27. An emergency venting assembly as recited in claim 25, wherein said attachment assembly comprises:
   (a) a cover retention feature connected to said housing and extending outwardly therefrom; and (b) a slide channel formed in said side wall of said cover, said slide channel being sized and configured to cooperate with said cover retention feature so as to allow said cover to slidingly move between said first position and said second position.

28. An emergency venting assembly as recited in claim 29, wherein said housing includes a side wall assembly configured to cooperate with said cover, said side wall assembly extending toward said cover and having said hole formed therein.

29. An emergency venting assembly as recited in claim 27, wherein said side wall assembly of said housing comprises:

(a) an inner wall having said hole formed therein; and
(b) an outer wall, said outer wall and said inner wall defining a channel to receive the remote end of said side wall of said cover therein.

30. An emergency venting assembly as recited in claim 27, wherein said cover retention feature is attached to said inner wall.

31. An emergency venting assembly as recited in claim 27, wherein said slide channel has a tear bar formed therein, said tear bar extending across said slide channel to prevent inadvertent movement of said cover.

* * * * *